United States Patent [19]
Meekers et al.

[11] Patent Number: 6,025,943
[45] Date of Patent: Feb. 15, 2000

[54] ARRANGEMENT FOR THE IMPLEMENTATION OF AN ADD/DROP METHOD IN WAVELENGTH-DIVISION MULTIPLEX TRANSMISSION OF OPTICAL SIGNALS

[75] Inventors: Bart Meekers, Kortessem, Belgium; Reinhard Maerz, Munich, Germany

[73] Assignee: Siemens Aktiengesellschaft, Munich, Germany

[21] Appl. No.: 08/941,114

[22] Filed: Sep. 30, 1997

[30] Foreign Application Priority Data

Sep. 30, 1996 [DE] Germany ................ 196 40 382

[51] Int. Cl.[7] .................................. H04J 14/02
[52] U.S. Cl. ................ 359/128; 359/127; 359/124; 359/130
[58] Field of Search .................... 359/124, 127, 359/128, 130

[56] References Cited

U.S. PATENT DOCUMENTS

| | | | |
|---|---|---|---|
| 5,771,112 | 6/1998 | Hamel et al. | 359/128 |
| 5,867,289 | 2/1999 | Gerstel et al. | 359/110 |

*Primary Examiner*—Jason Chan
*Assistant Examiner*—Hanh Phan
*Attorney, Agent, or Firm*—Hill & Simpson

[57] ABSTRACT

An arrangement for the implementation of an add/drop method in optical signals transmitted wavelength-division multiplex in which an interferometer includes a divider for generating signal parts from an optical signal which are forwarded to the two interferometer branches, a superposition device for superimposing the signal parts from the branches, respective add/drop means in each branch, and a phase delay in one branch.

6 Claims, 1 Drawing Sheet

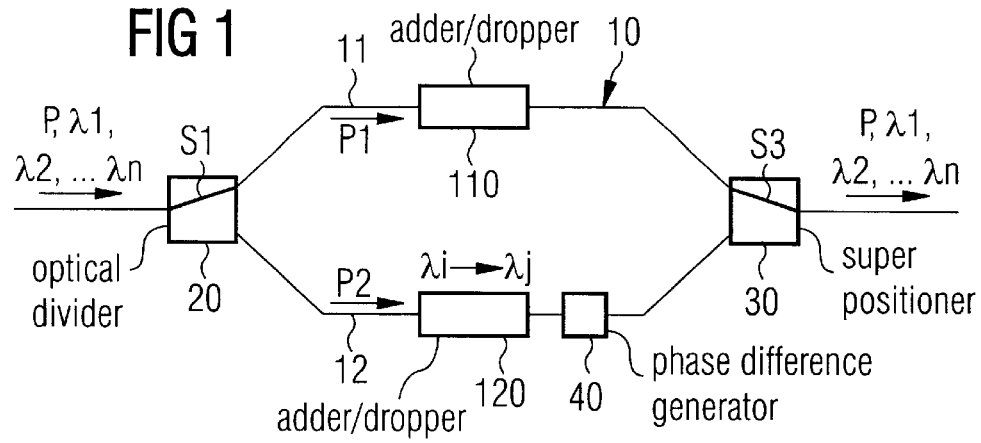
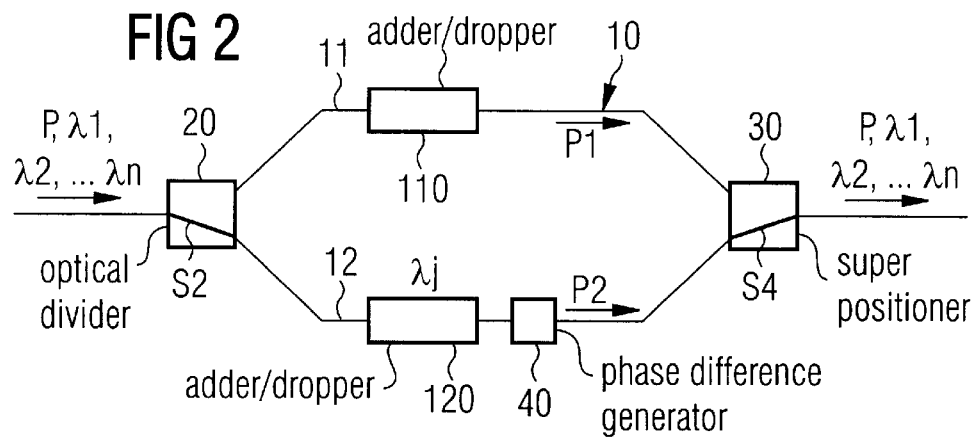
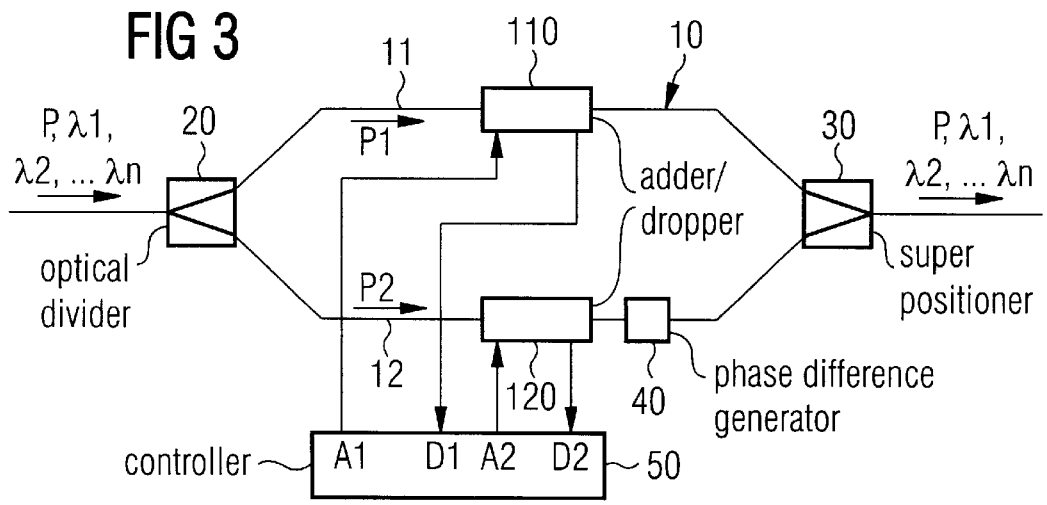

ARRANGEMENT FOR THE IMPLEMENTATION OF AN ADD/DROP METHOD IN WAVELENGTH-DIVISION MULTIPLEX TRANSMISSION OF OPTICAL SIGNALS

CLAIM TO PRIORITY

This application claims priority to German application No. 19640382.0 filed Sep. 30, 1996, the disclosure of which is incorporated herein by reference.

BACKGROUND OF THE INVENTION

Wavelength-division multiplexing techniques are employed for better utilization of the bandwidth of optical fibers and other waveguides. In order to be able to access different wavelength channels in a ring structure, an optical signal or power that is transmitted on one channel and carries, for example, message or signaling information must be essentially removed (dropped). The channel from which the optical signal has been dropped can be occupied with a new optical signal or power (added) that, for example, can contain message or signaling information. This method of removing an optical signal from a channel and then re-occupying this optical channel is known as the add/drop method.

There are various possibilities for realizing such an add/drop method: a) the optical signals transmitted on the various wavelength channels are wavelength-division multiplexed and the add/drop method is implemented with the assistance of a suitable waveguide structure and, subsequently, the optical signals—including the optical signal re-occupying the one channel—are again multiplexed; or b) a passive optical add/drop filter, for example a Mach-Zehnder Interferometer composed of, for example, planar quartz glass waveguides, is employed.

In transmission systems in which there is no fixed channel allocation, adjustable or, respectively, tunable waveguide structures or filters must be employed. In Case a), this can be achieved by using the add/drop method with the assistance of an array of optical switches, which comprises the waveguide structure, or that is present in addition to the waveguide structure. In Case b), the method is implemented with the assistance of an adjustable or, respectively, tunable add/drop filter.

The adjustable add/drop filter is a key component for wavelength-division multiplex networks (WDM networks). This component enables a logical WDM network topology to be switched without modifying the physical topology. This property can be employed for rebooting in case of an outage at the node or of a connection, in case of a temporary increase in the capacity between two points in that a plurality of channels are allocated to this connection, for adapting the network to the requirements of the user on a software basis and/or for producing temporarily unoccupied channels between two devices with optical interfaces.

When setting or tuning a traditional optical add/drop module for locating the desired wavelength channel, all channels between the previously set channel and the new channel to be located are disturbed for a certain time. As a result, the communication is interrupted and the application of adjustable or, respectively, tunable, passive add/drop devices becomes impractical.

SUMMARY OF THE INVENTION

The present invention provides an arrangement for using an add/drop method in an optical signal communication system.

In an embodiment, the invention provides an optical interferometer comprising a first branch and a second branch; an optical signal divider means from which the first and second branches diverge; an optical signal superposition means at which the first and second branches converge; a first signal add/drop means in the first branch; a second signal add/drop means in the second branch; and means for generating a phase difference in the second branch, wherein an optical signal transmitted over a plurality of optical wavelength channels in wavelength division multiplex fashion can effectively be dropped from a channel and another optical signal can be added to that channel. The optical signal divider means receives optical signals transmitted on the plurality of wavelength channels and generates first and second optical signal portions or parts for each of the first and second branches, respectively, for the optical signal to be dropped. The optical signal superposition means receives the optical signal portions from the first and second branches and superimposes one on the other. The means for generating a phase difference creates a phase difference between the optical signal portions so that the optical signal portion constructively interfere with one another when being superpositioned by the optical signal superposition means.

Given such an arrangement, there is the advantageous possibility of implementing an add/drop method given uninterrupted communication.

In an especially advantageous and preferred embodiment of the invention, the invention provides an interferometer, wherein the divider means continuously switches between two switch states such that in one switch state the optical signal of each channel supplied to the divider means is coupled into the first interferometer branch essentially unattenuated and the optical signal of each channel is coupled into the second interferometer branch attenuated essentially to zero, and in the other switch state, the optical signal of each channel supplied to the divider means is coupled into the second interferometer branch essentially unattenuated and into the first interferometer branch attenuated to essentially zero; and such that during the switching from one switch state into the other, the optical signal portion of each channel supplied to one branch essentially unattenuated is continuously attenuated to essentially zero and, at the same time, the optical signal portion of each channel supplied to the other branch for being coupled essentially at zero is brought from essentially zero to the essentially unattenuated optical signal level.

Preferably, the invention provides a superposition means continuously switchable between two switch states such that in one switch state, the unattenuated signal part of each channel coupled out of an interferometer branch is supplied to the superposition means essentially unattenuated and the signal part coupled out of the other interferometer branch is supplied attenuated essentially to zero, and in the other switch state, the signal part of each channel coupled out of the one interferometer branch is supplied to the superposition means attenuated essentially to zero and the signal part of this channel coupled out of the other interferometer branch is supplied essentially unattenuated, and such that during the switching from one switch state into the other, the unattenuated signal part coupled out of one branch is continuously attenuated to essentially zero and, at the same time, the signal part coupled out of the other branch and attenuated to zero is continuously boosted to its essentially unattenuated condition. Given this arrangement, there is the particular advantage that an add/drop method essentially can be implemented without disturbing the wavelength channels.

In a method for operating this arrangement for the implementation of an add/drop method leaving the channels essentially undisturbed, the invention provides that the divider means is switched into a switch state wherein the optical signal of each channel supplied to the divider means is coupled essentially unattenuated into one of the two interferometer branches, and the superposition means is swtiched into a switch state wherein the optical signal portion of each channel coupled out from this one interferometer branch is supplied essentially unattenuated to the superposition means; the add/drop means arranged in the other interferometer branch is set to a selected channel and an add/drop method is implemented on the selected channel with this add/drop means; in that, subsequently the divider means and the superposition means are simultaneously switched into the respectively other switch state and in that during each switching of the divider means and superposition means from one switch state into the respectfully other, the means for generating a phase difference is controlled such that the signal parts superimposed on one another in the superposition means constructively interfere with one another during the switching and thereafter.

These and other features of the invention are discussed in greater detail below in the following detailed description of the presently preferred embodiments with reference to the accompanying drawings.

BRIEF DESCRIPTION OF THE DRAWINGS

FIG. 1 illustrates an inventive arrangement with switchable divider means and switchable overlay (or heterodyne, interference or beat) means in a first switch state.

FIG. 2 illustrates the arrangement according to FIG. 1 in another switch state.

FIG. 3 illustrates an inventive arrangement with fixed divider means and fixed overlay means.

DETAILED DESCRIPTION OF THE PRESENTLY PREFERRED EMBODIMENTS

The inventive arrangements shown in FIGS. 1 through 3 serve for the implementation of an add/drop method for optical signals P transmitted in wavelength-division multiplex fashion over various optical wavelength channels $\lambda 1$ through $\lambda n$, in which method an optical signal P transmitted on a wavelength channel $\lambda 1, \lambda 2, \ldots$ or, respectively, $\lambda n$ (n being an arbitrary, natural number) can be essentially dropped from this channel $\lambda 1, \lambda 2, \ldots$ or, respectively, $\lambda n$ and this channel $\lambda 1, \lambda 2, \ldots$ or, respectively, $\lambda n$ can be occupied with another optical signal P to be transmitted on it.

Each of the arrangements according to FIGS. 1 through 3 comprises an optical interferometer means 10 that is comprises an optical divider means 20, two interferometer branches 11 and 12 and an optical super-position means 30.

The divider means 20 receives the optical signals P transmitted on the various wavelength channels $\lambda 1$ through $\lambda n$ and generates two signal parts P1 and P2 from a received optical signal P of each and every channel $\lambda 1, \lambda 2, \ldots$ or, respectively, $\lambda n$.

One of the two signals parts P1 and P2 of the optical signal P of every channel $\lambda 1, \lambda 2, \ldots$ or, respectively, $\lambda n$, for example, the signal part P1, (1) can be coupled into one of the two interferometer branches 11 and 12, for example the branch 11, (2) can be transmitted on this one branch 11, and (3) can be coupled out of this branch 11; and the other signal part, the signal part P2 of the optical signal P of every channel $\lambda 1, \lambda 2, \ldots$ or, respectively $\lambda n$, (1) can be coupled into the other interferometer branch, the branch 12 in the example, (2) can be transmitted on this other branch 12, and (3) can be coupled out of this other branch 12.

The signal parts P1 and, respectively, P2 coupled out of the interferometer branches 11 and 12 are superimposed on one another in the superposition means 30.

An add/drop means 110 is inventively arranged in the one interferometer branch 11, this being optionally adjustable to each of the wavelength channels $\lambda 1$ through $\lambda n$ and with which the one signal part P1 transmitted on this one branch 11 and the set channel $\lambda 1, \lambda 2, \ldots$ or, respectively, $\lambda n$ can be essentially removed from branch 11 before being coupled out of this branch 11 and with which a signal part P1 of an optical signal P to be transmitted on this set channel $\lambda 1, \lambda 2, \ldots$ or, respectively, $\lambda n$ can be coupled into this one branch 11, transmitted on this branch 11 and coupled out of this branch 11 into the superposition means 30 (add/drop method).

An add/drop means 120 is also inventively arranged in the other interferometer branch 12, this being optionally adjustable to each of the wavelength channels $\lambda 1, \lambda 2, \ldots$ or, respectively, $\lambda n$, and with which the signal part P2 transmitted on this other branch 12 and the set channel $\lambda 1, \lambda 2, \ldots$ or, respectively, $\lambda n$, can be essentially removed from this other branch 12 before it is coupled out and with which a signal part P2 of an optical signal P to be transmitted on this set channel $\lambda 1, \lambda 2, \ldots$ or, respectively, $\lambda n$, can be coupled into this other branch 12, transmitted on this other branch 12, and coupled out of this other branch 12 into the superposition means 30.

A means 40 for generating a phase difference, also positioned within branch 12, generates a phase difference $\Delta \phi$ between the signal part P1 of a channel $\lambda 1, \lambda 2, \ldots$ or, respectively, $\lambda n$, to be coupled out of the one interferometer branch 11 into the superposition means 30 and the signal part P2 of this channel $\lambda 1, \lambda 2, \ldots$ or, respectively, $\lambda n$, to be coupled out of the other interferometer branch 12 into the superposition means 30 such that the signal parts P1 and P2 superimposed on one another in the superposition means 30 constructively interfere with one another.

The interferometer 10 preferably is a Mach-Zehnder interferometer having the means 40 for generating phase difference as a component part of the interferometer 10. The add/drop devices 110 and 120 should work as phase-independently as possible in the region of the channels $\lambda 1$ through $\lambda n$. The divider means 20 and the superposition means 30 should work optimally wavelength-independently in the region of the channels $\lambda 1$ through $\lambda n$. This is also particularly true for the switchable divider means 20 and for the superposition means 30.

A control means 40 for generating phase difference can comprise a continuously adjustable phase difference $\Delta \phi$ between a signal part P1 coupled out of the one interferometer 11 into the superposition means 30 and a signal part P2 coupled out from the other interferometer branch 12 into the superposition means 30.

An optical signal P supplied to the divider means 20 can differ from channel to channel but only within a prescribable, permitted tolerance range. Correspondingly, the signal parts P1 and P2 can differ from channel to channel. A signal part P1 or, respectively, P2 coupled into the branch 11 or, respectively, 12 and replacing a signal part P1 or, respectively, P2 dropped from an interferometer branch 11 or 12 can also be different from the dropped signal part P1 or, respectively, P2 within the allowable range of tolerance. The signal part P1 or, respectively, P2 replacing the dropped (or removed) signal part P1 or, respectively, P2 can, like it, contain message or signaling information.

The arrangement according to FIGS. 1 and 2 comprises a divider means 20 which is continuously switchable between two switch states S1 and S2 such that: (1) in one of the two switch states S1 and S2, for example, in the switch state S1, the optical signal P of every channel $\lambda 1, \lambda 2, \ldots$ or, respectively, $\lambda n$ supplied to the divider means 20 is coupled essentially unattenuated into one of the two interferometer branches 11 and 12, for example the branch 11, and the signal part P2 of this channel $\lambda 1, \lambda 2, \ldots$ or, respectively, $\lambda n$ coupled into the other interferometer branch, into the branch 12 in the example, attenuated essentially to zero; and (2) in the other switch state, the switch state S2 in the example, the optical signal P of every channel $\lambda 1, \lambda 2, \ldots$ or, respectively, $\lambda n$ supplied to the divider means 20 is coupled essentially unattenuated into the other interferometer branch 12, and the signal part P2 of this channel $\lambda 1, \lambda 2, \ldots$ or, respectively, $\lambda n$ coupled into the one interferometer branch 11 attenuated essentially to zero.

During the switching from one switch state S1 or S2 into the other switch state S2 or, respectively, S1, the optical signal P of each channel $\lambda 1, \lambda 2, \ldots$ or, respectively, $\lambda n$ supplied to a branch 11 or, respectively, 12 essentially unattenuated is continuously attenuated to essentially zero and, at the same time, the signal part P2 or, respectively, P1 of each channel $\lambda 1, \lambda 2, \ldots$ or, respectively, $\lambda n$ supplied to the other branch 12 or, respectively, 11 attenuated essentially to zero is brought from essentially zero to the essentially unattenuated level of optical signal P of this channel $\lambda 1, \lambda 2, \ldots$ or, respectively, $\lambda n$.

The arrangement of FIGS. 1 and 2 further comprises a superposition means 30 continuously switchable such between two switch states S3 and S4 that: (1) in one of these two switch states S3 and S4, for example in the switch state S3, the signal part P1 of each channel $\lambda 1, \lambda 2, \ldots$ or, respectively, $\lambda n$ coupled out of one of the two interferometer branches 11 and 12, for example, the interferometer branch 11, is supplied to the superposition means 30 essentially unattenuated and the signal part 25 P2 of this channel $\lambda 1, \lambda 2, \ldots$ or, respectively, $\lambda n$ coupled out from the other interferometer branch 12 is supplied essentially attenuated to zero, and (2) in the other switch state, in the switch state S4 in the example, the signal part P1 of each channel $\lambda 1, \lambda 2, \ldots$ or, respectively, $\lambda n$ coupled out of the one interferometer branch 11 is supplied to the superposition means 30 attenuated essentially to zero and the signal part P2 of this channel $\lambda 1, \lambda 2, \ldots$ or, respectively, $\lambda n$ coupled out of the other interferometer branch 12 is supplied essentially unattenuated.

During the switching from one switch state S3 or S4 into the other switch state S4 or, respectively, S3, the attenuated signal part P1 or, respectively, P2 coupled out of an branch 11 or, respectively 12, is continuously attenuated to essentially zero and, at the same time, the signal part P2 or, respectively, P1 coupled out of the other branch 12 or, respectively, 11 and attenuated to zero is continuously boosted to its essentially unattenuated condition.

The arrangement according to FIGS. 1 and 2 for implementation of an add/drop method preferably is operated such, essentially without disturbing the wavelength channels, that the switchable divider means 20 is switched into a switch state wherein the optical signal P of each channel $\lambda 1, \lambda 2, \ldots$ or, respectively, $\lambda n$ supplied to the divider means 20 is coupled into one of the two interferometer branches essentially unattenuated, so that the signal part coupled into this interferometer branch is essentially composed of this optical signal P. At the same time, the superposition means 30 is switched into the switch state wherein the signal part P1 of each channel $\lambda 1, \lambda 2, \ldots$ or, respectively, $\lambda n$ coupled out of this one interferometer branch 11 is supplied to the superposition means 30 essentially unattenuated, i.e. is switched into the switch state S3, so that the first switch state S1 and S3 of the arrangement shown in FIG. 1 is established. This first switch state S1 and S3, for example, is established after implementation of an add/drop method with the assistance of the add/drop means 110 with respect to a specific wavelength channel $\lambda i$ (i=1, 2, ... n).

In this first switch state S1 and S3, the optical signal P supplied to the divider means 20 is supplied to the superposition means 30 essentially only via the one interferometer branch 11, whereas it is essentially the signal part P2=0 that is transmitted via the other interferometer branch 12. The optical signal P supplied to the divider means 20 can thus be essentially taken from the superposition means 30.

In this first switch state S1 and S3, the add/drop means 120 arranged in the other interferometer branch 12 is set to a selected channel $\lambda j$ different from the specific channel $\lambda i$ and an add/drop method is implemented on the selected channel $\lambda j$ with this add/drop means 120. Due to the first switch state S1 and S3, the signal part P2 taken from the other interferometer branch 12 or coupled out is essentially zero in this method before being coupled out into the superposition means 30 and the signal part P2 added to the selected channel $\lambda j$ and coupled out into the superposition means 30 does not proceed into the superposition means since it is attenuated to essentially zero.

Subsequently, the divider means 20 and the superposition means 30 are simultaneously switched into the respectively other switch state S2 or, respectively, S4, so that the second switch state S2 and S4 of this arrangement shown in FIG. 2 is present, wherein the optical signal P supplied to the divider means 20 is supplied to the superposition means 30 essentially only via the other interferometer branch 12, whereas it is essentially the signal part P2=0 that is transmitted via the one interferometer branch 11. The optical signal P supplied to the divider means 20 can thus again be essentially taken from the superposition means 30.

During the switching of the divider means 20 and superposition means 30 from one switch state S1 and S2 or into the respectively other switch state S3 and S4, the means 40 for generating a phase difference is controlled such that the signal parts P1 and P2 superimposed on one another in the superposition means 30 constructively interfere with one another during the switching and thereafter.

After this, an add/drop method can be implemented by setting the add/drop means 110 to a selected channel and by subsequent, simultaneous switching of the divider means 20 and superposition means 30 into the switch state S1 and S2.

What is important is that the means 40 for generating phase difference is controlled such during every switching of the divider means 20 and superposition means 30 from one switch state S1 and S2 or S3 and S4 into the respectively other switch state S3 and S4 or, respectively, S1 and S2 that the signal parts P1, P2 superimposed on one another in the superposition means 30 constructively interfere with one another during the switching and thereafter.

In this implementation of an add/drop method, the channels are left essentially undisturbed. Only the specific, old channel and the selected, new channel are disturbed during a switching of the divider means 20 and superposition means 30 into a different switch state without the communication being thereby interrupted.

The arrangement shown in FIG. 3 comprises a divider means 20 for dividing optical signal P of each channel λ1, λ2, . . . or, respectively, λn into two fixed signal parts P1 and P2 of this channel λ1, λ2, . . . or, respectively, λn of essentially equal size, the one thereof, for example, the signal part P1, being coupled into one interferometer branch, for example the branch 11, and the other signal part thereof, the signal part P2 in the example, being coupled into the other interferometer branch, into the branch 12 in the example. In this arrangement, the signal parts P1 and P2 of each channel λ1, λ2, . . . or, respectively, λn coupled out of the two interferometer branches 11 and 12 are respectively supplied to the superposition means 30 essentially unattenuated.

A switchable divider means 20 and switchable superposition means can be respectively realized by an optical directional coupler.

Compared to the arrangement of FIGS. 1 and 2, the arrangement of FIG. 3 is structurally simpler since the divider means 20 and superposition means 30 need not be switchable and can be realized more simply.

For the implementation of an add/drop method, the arrangement of FIG. 3 is operated such that an add/drop means, for example, the add/drop means 110, is set from a specific channel λi to which it was set to a selected channel λj and an add/drop method is implemented on the selected channel λj with this add/drop means 110, and such that, subsequently, the other add/drop means, the add/drop means 120 in the example, is set from the specific channel λi to which it was set to the selected channel λj and an add/drop method is implemented on the specific channel λj with this other add/drop means 120.

During this setting of the add/drop means 110 and 120, the specific channel λi, the selected channel λj and all channels lying between these two channels are respectively temporarily disturbed such that the optical signal P of these channels is temporarily attenuated by 3 dB. In no case is the communication interrupted.

Subsequently, an add/drop method can again be implemented on a new, selected channel by successive setting of the add/drop means 110 and 120.

FIG. 3 includes a control means 50 for controlling the add/drop method. Such a control means can also be provided in an arrangement according to FIGS. 1 and 2. In FIG. 3, A1 and A2 respectively stand for Add and D1 and D2 respectively stand for Drop.

An add/drop means 110 or, respectively, 120 can generally be realized as a hybrid means that is composed of individual components provided, for example, with fiber tails or can be realized as an integrated optical circuit.

Coming into consideration for integrated optical networks are: $LiNbO_3$ for acousto-optical filters, particularly as an add/drop means, electro-optical switches and phase shifters with a tuning or, respectively, setting speed in the microsecond range and electro-optical filters, particularly as an add/drop means, electro-optical switches and electro-optical phase shifters, glass, for example, quartz glass on silicon and ion exchange, polymers for thermo-optical filters, particularly as add/drop means, thermo-optical switches and phase shifters and components that are based on charge carrier injection in InGaAsP/P and GaAlAs/GaAs.

The setting of an add/drop means to a respectively new selected channel can ensue, for example, with an address that, for example, is specified by a tone modulated to the optical signal of a channel.

Although modifications and changes may be suggested by those skilled in the art, it is the intention of the inventors to embody within the patent warranted hereon all changes and modifications as reasonably and properly come within the scope of their contribution to the art.

We claim:

1. An optical interferometer, comprising:

a first branch and a second branch;

an optical divider configured to be coupled to a multi-channel optical wavelength transmission line and from which the first and second branches diverge;

an optical signal superposition means configured to be coupled to a multichannel optical wavelength transmission line and at which the first and second branches converge;

a first signal add/drop means in the first branch and a second signal add/drop means in the second branch; and phase difference means in the second branch, wherein:

an optical signal transmitted over an optical wavelength channel in wavelength division multiplex fashion can effectively be dropped from the channel and another optical signal can be added to that channel;

the optical divider is configured to receive optical signals transmitted in wavelength division multiplex fashion on the plurality of wavelength channels and generate optical signal portions for each of the first and second branches for the optical signal to be dropped;

the optical signal superposition means is configured to receive the optical signal portions from the first and second branches and superimpose one on the other; and the phase difference means is configured to create a phase difference between the optical signal portions so that the optical signal portions constructively interfere with one another when being superpositioned by the optical signal superposition means.

2. The interferometer according to claim 1, wherein the phase difference means comprise means for adjusting the phase difference between the optical signal portions.

3. The interferometer according to claim 1, wherein the optical divider continuously switches between two switch states and is configured such that, in one switch state, the optical signal portions is coupled into the first branch is essentially unattenuated and the optical signal portion coupled into the second branch is essentially zero, and, in the other switch state, the optical signal portion is coupled into the second branch is essentially unattenuated and the optical signal portion coupled into the first branch is essentially zero; and such that during the switching from one switch state into the other, the optical signal portion coupled into a branch essentially unattenuated is continuously attenuated to essentially zero and, at the same time, the optical signal portion coupled into the other branch is brought from essentially zero to an essentially unattenuated level, and wherein the superposition means is continuously switchable between two switch states such that, in one switch state, the signal portion which is essentially unattenuated is coupled out of one of the branches at an essentially to zero level, and the signal portion which is unattenuated is coupled out of the other, in the other switch state, the signal portion of each channel which is supplied to the superposition means attenuated essentially to zero and the signal part of this channel coupled out of the other branch is supplied essentially unattenuated, and such that during the switching from one switch state into the other, the unattenuated signal part coupled out of one branch is continuously attenuated to essentially zero and, at the same time, the signal part coupled out of the other branch and attenuated to zero is continuously boosted to its essentially unattenuated condition.

4. The interferometer of claim 1, wherein said divider divides an optical signal of each channel into two fixed signal parts of essentially the same size, one signal part being coupled into the first branch and the other signal part being coupled into the other branch, and the superposition means with which the signal parts of each channel are coupled out of the two branches receives the signal parts essentially unattenuated.

5. A method implementing an add/drop method comprising the steps of providing:

a first branch and a second branch;

an optical divider configured to be coupled to a multichannel optical wavelength transmission line and from which the first and second branches diverge;

an optical signal superposition means configured to be coupled to a multichannel optical wavelength transmission line and at which the first and second branches converge;

a first signal add/drop means in the first branch and a second signal add/drop means in the second branch; and phase difference means in the second branch, wherein:

an optical signal transmitted over an optical wavelength channel in wavelength division multiplex fashion can effectively be dropped from the channel and another optical signal can be added to that channel;

the optical divider is configured to receive optical signals transmitted in wavelength division multiplex fashion on the plurality of wavelength channels and generate optical signal portions for each of the first and second branches for the optical signal to be dropped;

the optical signal superposition means is configured to receive the optical signal portions from the first and second branches and superimpose one on the other; and the phase difference means is configured to create a phase difference between the optical signal portions so that the optical signal portions constructively interfere with one another when being superpositioned by the optical signal superposition means;

switching the divider into a switch state wherein the optical signal of each channel supplied to the divider is coupled essentially unattenuated into one of the two branches; and switching the superposition means into a switch state wherein the signal part of each channel coupled out from this one branch is supplied essentially unattenuated to the superposition means;

setting the add/drop means arranged in the other branch to a selected channel and implementing an add/drop method on this selected channel with the add/drop means;

subsequently simultaneously switching the divider and the superposition means into their respectively other switch state;

during each switching of the divider and superposition means from one switch state into the respectively other, controlling the phase means for generating a phase difference such that the signal portions superimposed on one another in the superposition means constructively interfere with one another during the switching and thereafter.

6. The method of claim 5 wherein an add/drop means is set to a selected channel and an add/drop method is implemented on the selected channel with this add/drop means; and wherein, subsequently, the other add/drop means is set to the selected channel and an add/drop method is implemented on this specific channel with this other add/drop means.

* * * * *